United States Patent
Torikata

(10) Patent No.: US 12,429,810 B2
(45) Date of Patent: *Sep. 30, 2025

(54) SUPPORT FRAME FOR SHEET CONVEYING APPARATUS AND SHEET CONVEYING APPARATUS

(71) Applicant: CANON KABUSHIKI KAISHA, Tokyo (JP)

(72) Inventor: Kotaro Torikata, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

This patent is subject to a terminal disclaimer.

(21) Appl. No.: 18/447,182

(22) Filed: Aug. 9, 2023

(65) Prior Publication Data

US 2024/0019808 A1 Jan. 18, 2024

Related U.S. Application Data

(63) Continuation of application No. 17/318,750, filed on May 12, 2021, now Pat. No. 11,762,324.

(30) Foreign Application Priority Data

May 27, 2020 (JP) .................................. 2020-092205

(51) Int. Cl.
| | |
|---|---|
| *G03G 21/16* | (2006.01) |
| *B41J 29/02* | (2006.01) |
| *B41J 29/06* | (2006.01) |
| *B60B 33/00* | (2006.01) |

(52) U.S. Cl.
CPC .......... *G03G 21/1619* (2013.01); *B41J 29/02* (2013.01); *B41J 29/06* (2013.01); *B60B 33/0005* (2013.01); *B65H 2402/441* (2013.01); *B65H 2801/06* (2013.01)

(58) Field of Classification Search
CPC .......... G03G 21/1619; B65H 2402/441; B60B 33/0005; B60B 33/0002; B60B 33/0026
See application file for complete search history.

(56) References Cited

U.S. PATENT DOCUMENTS

| | | | |
|---|---|---|---|
| 8,857,774 B2 | 10/2014 | Aoyama | ............ B60B 33/0002 |
| 11,762,324 B2 * | 9/2023 | Torikata | .................. B41J 29/02 |
| | | | 271/3.18 |
| 2011/0215514 A1 * | 9/2011 | Terao | ..................... F16M 11/20 |
| | | | 270/58.08 |

FOREIGN PATENT DOCUMENTS

| | | |
|---|---|---|
| JP | 2002-016384 | 1/2002 |
| JP | 2020-026859 | 2/2020 |

OTHER PUBLICATIONS

Office Action dated Apr. 2, 2024 in counterpart Japanese Application No. 2020-092205, together with English translation thereof.

* cited by examiner

*Primary Examiner* — Jeremy R Severson
(74) *Attorney, Agent, or Firm* — Venable LLP

(57) ABSTRACT

A support frame for a sheet conveying apparatus includes a bottom plate that includes a first member having a first surface portion and a first wall portion and a second member having a second surface portion and a second wall portion, a support rod that is fixed to the bottom plate, and a plurality of installation members that is fixed to the bottom plate and installs the sheet conveying apparatus. The second member is fixed to the first member by the second wall portion overlapping and being joined to the first wall portion on an outer side of the first wall portion.

11 Claims, 14 Drawing Sheets

SUPPORT FRAME FOR SHEET CONVEYING APPARATUS AND SHEET CONVEYING APPARATUS

This application is a continuation of application Ser. No. 17/318,750 filed May 12, 2021, which issued as U.S. Pat. No. 11,762,324 on Sep. 19, 2023; and claims priority under 35 U.S.C. § 119 to Japan Application JP 2020-092205 filed in Japan on May 27, 2020; and the contents of all of which are incorporated herein by reference as if set forth in full.

BACKGROUND OF THE INVENTION

Field of the Invention

The present invention relates to a support frame for a sheet conveying apparatus that conveys a sheet and a sheet conveying apparatus having the support frame.

Description of the Related Art

Conventionally, a support frame for an image forming apparatus that forms an image on a sheet or a conveying apparatus that conveys a sheet includes a side plate, a support rod, a top plate, a bottom plate, and a stay that each include sheet metal or a pipe material. The bottom plate of such a support frame is particularly required to have high strength and rigidity, while the thickness and weight are reduced.

In such a situation, Japanese Patent Application Laid-Open No. 2002-16384 discloses a support frame for a sheet conveying apparatus in which a first member forming an upper surface and a second member forming a lower surface are stacked in a box shape in such a way that the inside is hollow so that a bottom plate is formed. In the support frame of Japanese Patent Application Laid-Open No. 2002-16384, the edges of the first member and the second member are molded into a gutter shape, a flat surface portion and a wall portion are formed in the first member and the second member, and the wall portions of the first member and the second member are joined to each other, so that the bottom plate is formed. Further, the support frame of Japanese Patent Application Laid-Open No. 2002-16384 is configured so that the wall portion of the first member is arranged outside the wall portion of the second member, and the first member covers the second member.

The support frame of Japanese Patent Application Laid-Open No. 2002-16384 with the configuration described above can prevent the twist and deformation when being installed on an uneven installation surface, and thus can achieve high flatness in the entire bottom plate and prevent the internal parts of an apparatus to be arranged from tilting.

Furthermore, a plurality of installation members such as casters for transporting the apparatus to be arranged or adjusters for preventing the installed apparatus from moving and anchoring the apparatus is attached to the bottom plate of the support frame for the conventional sheet conveying apparatus in which the bottom plate includes the upper surface member and the lower surface member. In this case, the bottom plate can be provided at a position as low as possible in order to reduce the height of the entire apparatus and make the apparatus compact. For this reason, the support frame for the conventional sheet conveying apparatus adopts a configuration in which the caster is attached to a drawn portion that has a shape obtained by drawing the lower surface member of the bottom plate upward, or a configuration in which the caster inserted into a hole in the lower surface member of the bottom plate is attached to the upper surface member.

Generally, when a plurality of mounting portions such as drawn portions or holes is provided in the bottom plate in order to attach a plurality of installation members such as casters to the end portions of the bottom plate, it is necessary to provide a space between the edge portion of the member including the lower surface and the mounting portion in a horizontal direction for the purpose of achieving the strength and rigidity of the bottom plate. In this case, in Japanese Patent Application Laid-Open No. 2002-16384, since the first member, which is a size larger than the second member, covers the second member, there is a problem that the projected area of the bottom plate is larger than the projected area of the installation surface of the apparatus surrounded by a virtual line connecting the plurality of installation members, and the apparatus becomes large.

It is desirable to provide a support frame for a sheet conveying apparatus that can reduce the difference in the projected area of a bottom plate with respect to the projected area of an installation surface of the apparatus as compared with a conventional case, while achieving strength and rigidity in a case where the bottom plate includes an installation member.

SUMMARY OF THE INVENTION

A support frame for a sheet conveying apparatus according to the present invention is a support frame for a sheet conveying apparatus that includes a bottom plate that includes a first member that has a first surface portion with a substantially rectangular shape and a first wall portion that is bent at a substantially right angle to the first surface portion and extends vertically downward from a peripheral edge of the first surface portion, the peripheral edge having a substantially rectangular shape, and a second member that has a second surface portion with a substantially rectangular shape and a second wall portion that is bent at a substantially right angle to the second surface portion and extends vertically upward from a peripheral edge of the second surface portion, the peripheral edge having a substantially rectangular shape, a support rod that is fixed to the bottom plate, and a plurality of installation members that is fixed to the bottom plate and installs the sheet conveying apparatus on an installation surface, wherein the second member is fixed to the first member by the second wall portion overlapping and being joined to the first wall portion on an outer side of the first wall portion.

Further features of the present invention will become apparent from the following description of exemplary embodiments with reference to the attached drawings.

DESCRIPTION OF THE EMBODIMENTS

Figure 1:
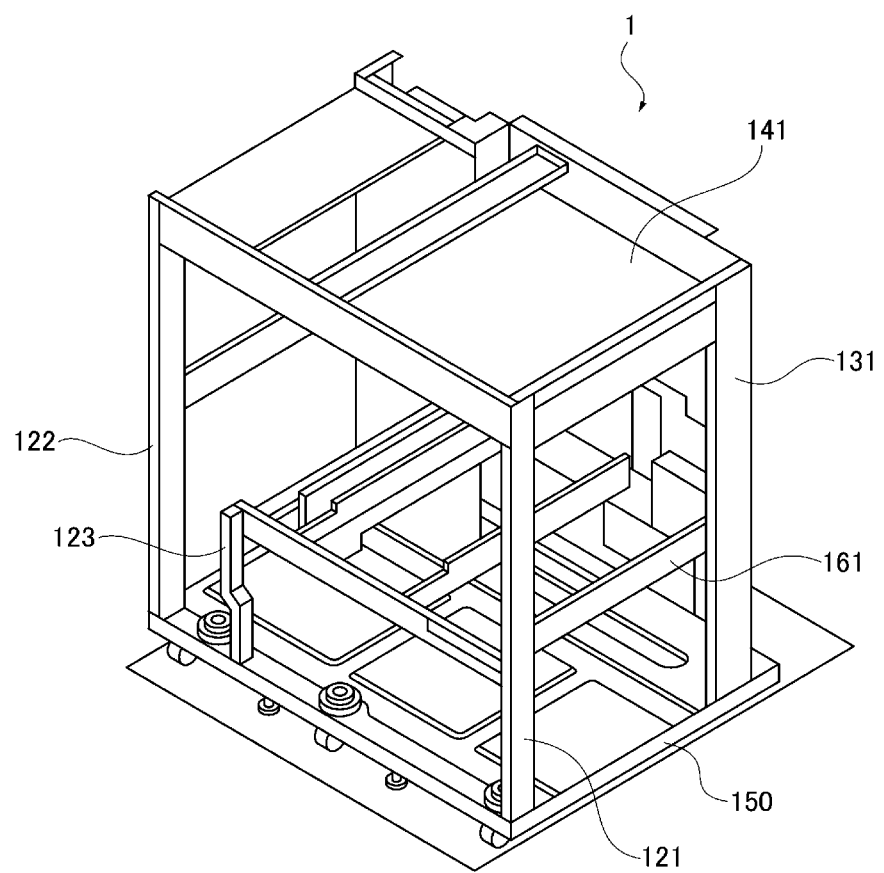
FIG. 1 is a perspective view of a support frame for a sheet conveying apparatus according to an embodiment of the present invention.
Figure 2:
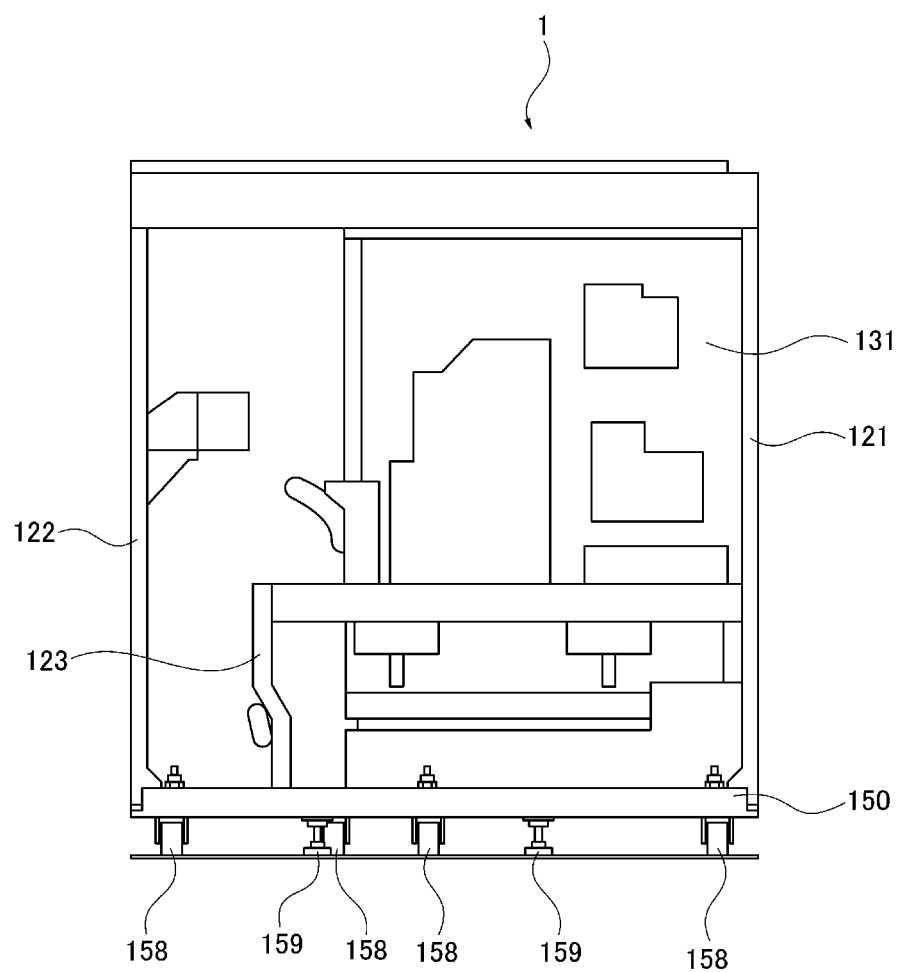
FIG. 2 is a front view of the support frame for a sheet conveying apparatus according to the embodiment of the present invention.
Figure 3:
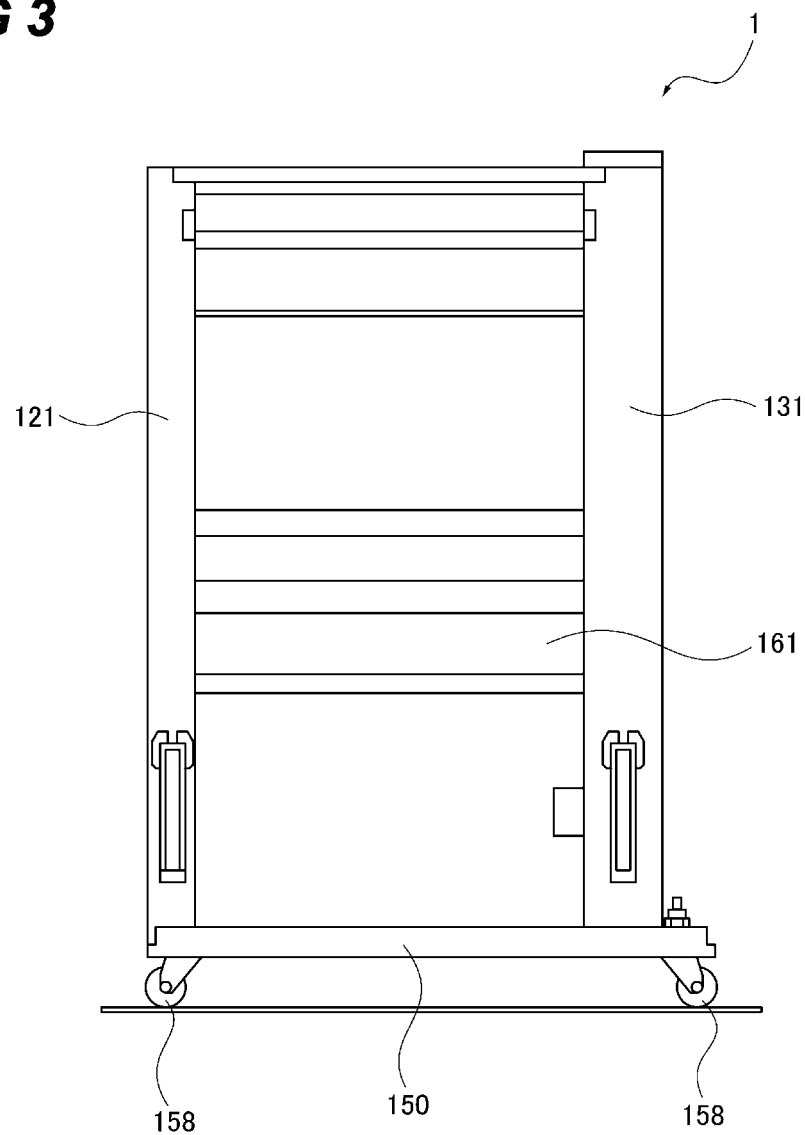
FIG. 3 is a side view of the support frame for a sheet conveying apparatus according to the embodiment of the present invention.
Figure 4:
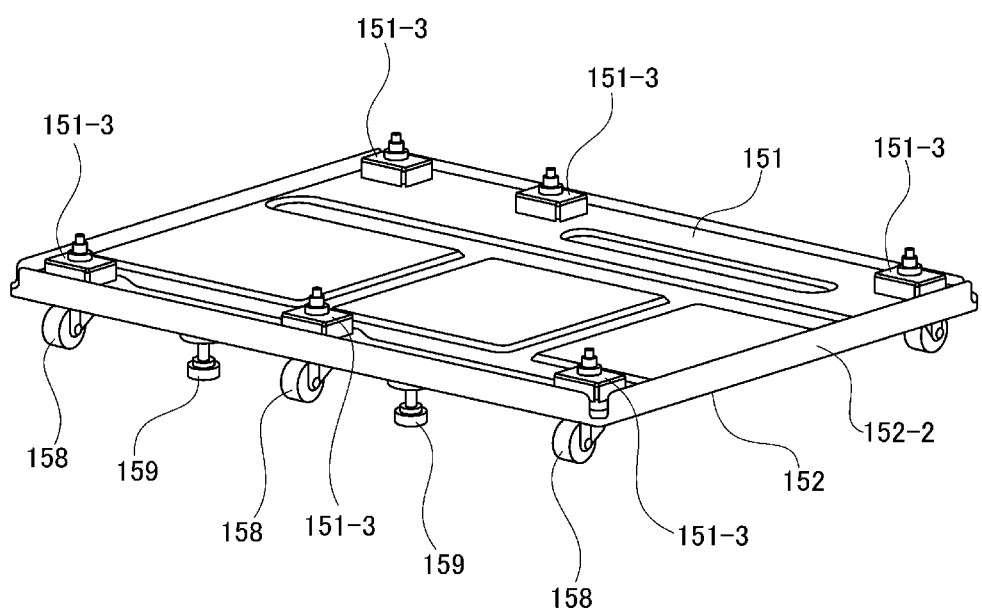
FIG. 4 is a perspective view of a bottom plate of the support frame for a sheet conveying apparatus according to the embodiment of the present invention, as viewed from above.

Hereinafter, an embodiment will be described in detail with reference to the drawings.

Configuration of Support Frame for Sheet Conveying Apparatus

The configuration of a support frame 1 for a sheet conveying apparatus according to an embodiment of the present invention will be described in detail with reference to FIGS. 1 to 4.

The support frame 1 for a sheet conveying apparatus has a rectangular parallelepiped shape as a whole. The support frame 1 supports a sheet conveying apparatus (not illustrated) such as a conveying apparatus that sequentially conveys a recording material such as a sheet or a sheet material of an OHP sheet on which a toner image is formed in an image forming apparatus. Further, the support frame 1 also supports a fixing device that heats and pressurizes the toner image formed on the recording material to fix the toner image. Although a description is given by using the sheet conveying apparatus as an example, the configuration of the present embodiment may be applied to an image forming apparatus as a sheet conveying apparatus including an image forming unit that forms an image and a sheet conveying unit.

Specifically, the support frame 1 has support rods 121, 122, and 123, a side plate 131, a top plate 141, a bottom plate 150, and a stay 161.

The support rods 121, 122, and 123, the side plate 131, the top plate 141, the bottom plate 150, and the stay 161 each include sheet metal obtained by performing plastic processing on a metal plate. The support rods 121, 122, and 123 include metal pipes, or are formed by bending metal plates or combining bent metal plates in a prismatic shape.

The bottom plate 150 includes casters 158 and adjusters 159.

The caster 158 includes a wheel that rotates in contact with an installation surface such as a floor, and a swivel portion having a wheel that can rotate about an axis perpendicular to the installation surface as a rotation axis. The caster 158 is provided to cause a device such as a sheet conveying apparatus to be movable. The caster 158 is an installation member provided at the end portion or corner of the bottom plate 150.

The adjuster 159 is provided to anchor an apparatus (not illustrated) such as a conveying apparatus arranged in the support frame 1 after the apparatus is installed. The adjuster 159 is an installation member provided at the end portion of the bottom plate 150.

Configuration of Bottom Plate

Figure 6:
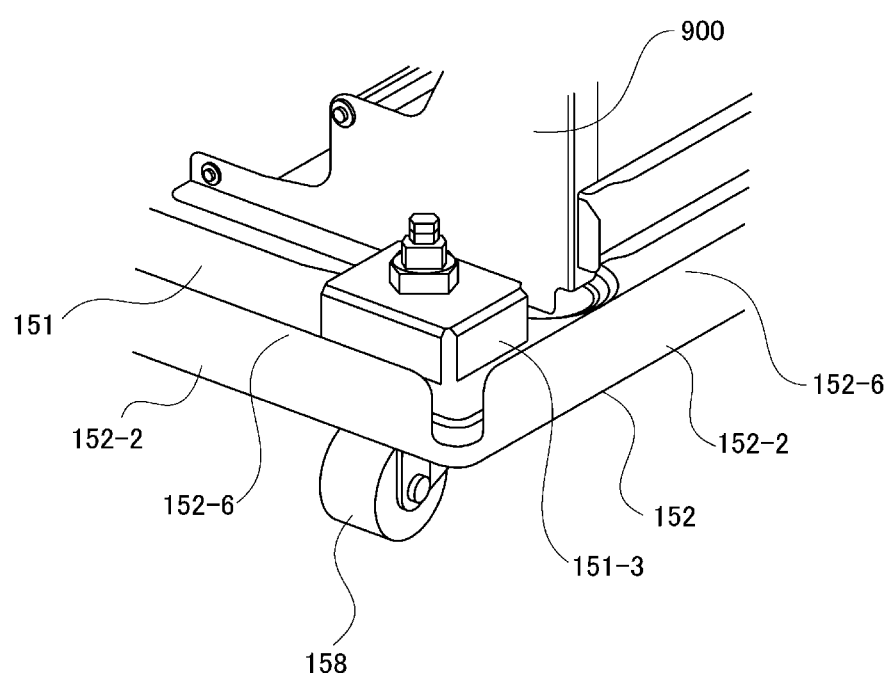
FIG. 6 is a perspective view of a part of the bottom plate of the support frame for a sheet conveying apparatus according to the embodiment of the present invention.
Figure 7:
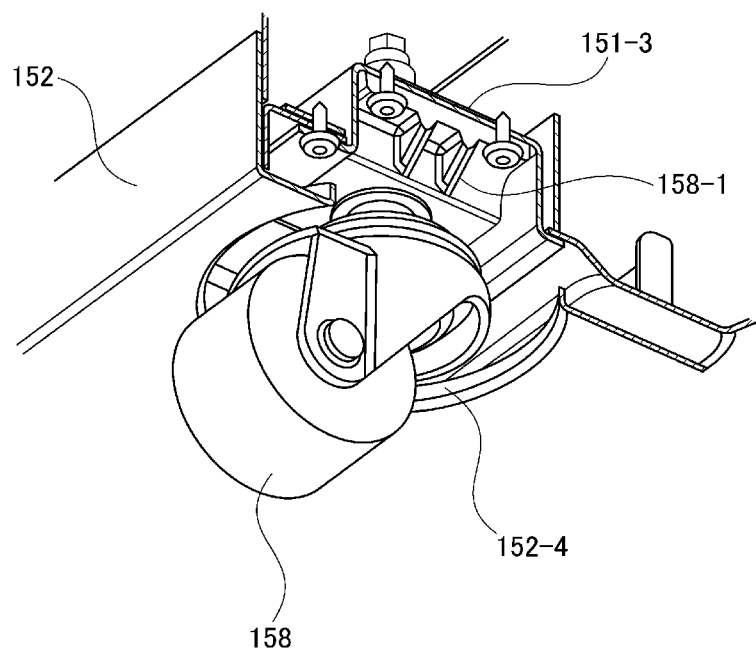
FIG. 7 is a cutaway perspective view of a part of the bottom plate of the support frame for a sheet conveying apparatus according to the embodiment of the present invention.
Figure 8:
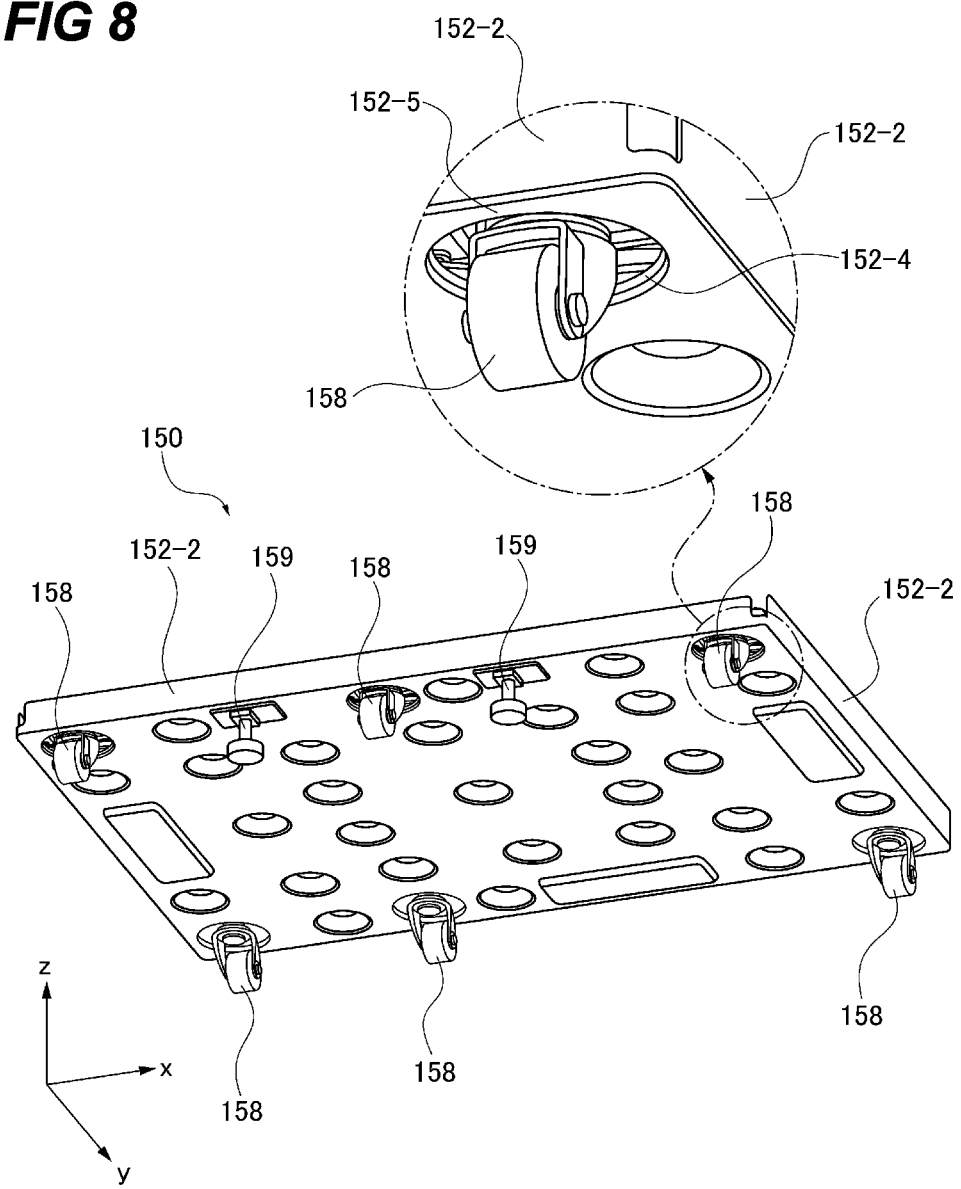
FIG. 8 is a perspective view of the bottom plate of the support frame for a sheet conveying apparatus according to the embodiment of the present invention, as viewed from below.

The configuration of the bottom plate 150 according to the embodiment of the present invention will be described in detail with reference to FIGS. 4 to 10. In FIGS. 8 and 10, the x-axis, y-axis, and z-axis form a 3-axis Cartesian coordinate system, and a description is given with the positive direction of the y-axis being a back direction, the negative direction of the y-axis being a front direction, the positive direction of the x-axis being a right direction, the negative direction of the x-axis being a left direction, the positive direction of the z-axis being an up direction, and the negative direction of the z-axis being a down direction.

The bottom plate 150 includes a first member 151 and a second member 152, and the first member 151 and the second member 152 are fitted in a box shape each other in such a way that the inside is hollow, while the second member 152 covers the first member 151. The bottom plate 150 includes a cavity portion 153 that is formed in the internal space surrounded by the first member 151 and the second member 152.

The first member 151 forms the upper surface of the bottom plate 150 in a vertical direction, and has a substantially rectangular shape when viewed from above in the vertical direction. Here, the substantially rectangular shape includes not only a shape in which the four corners are right angles, but also a shape in which each of the four corners is chamfered. As illustrated in FIG. 6, a recording material conveying member 900 for an apparatus such as a sheet conveying apparatus is attached on the upper surface of the first member 151.

The first member 151 includes a flat surface portion 151-1 that is flat along a horizontal direction parallel to an x-y plane, an edge wall portion 151-2 that is provided on the peripheral edge of the rectangle, a mounting shape portion 151-3, lance portions 151-4 and 151-5, and a mounting portion 158-1.

Figure 9:
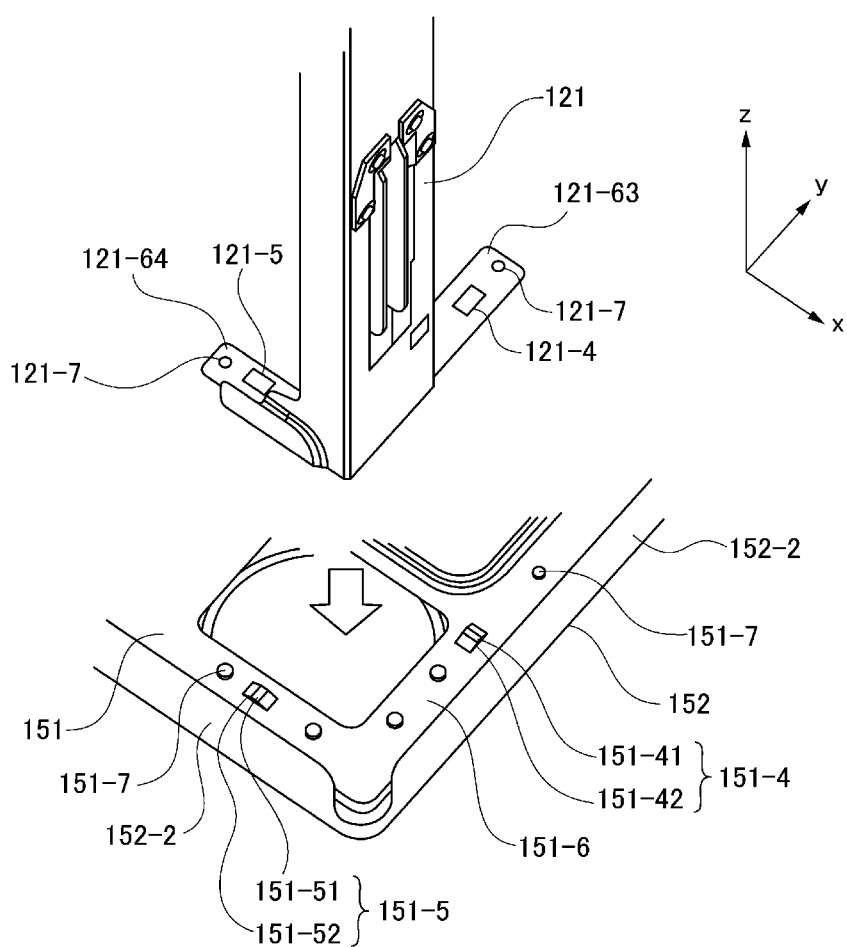
FIG. 9 is an exploded perspective view of a joint portion of the bottom plate and a support rod of the support frame for a sheet conveying apparatus according to the embodiment of the present invention.
Figure 10:
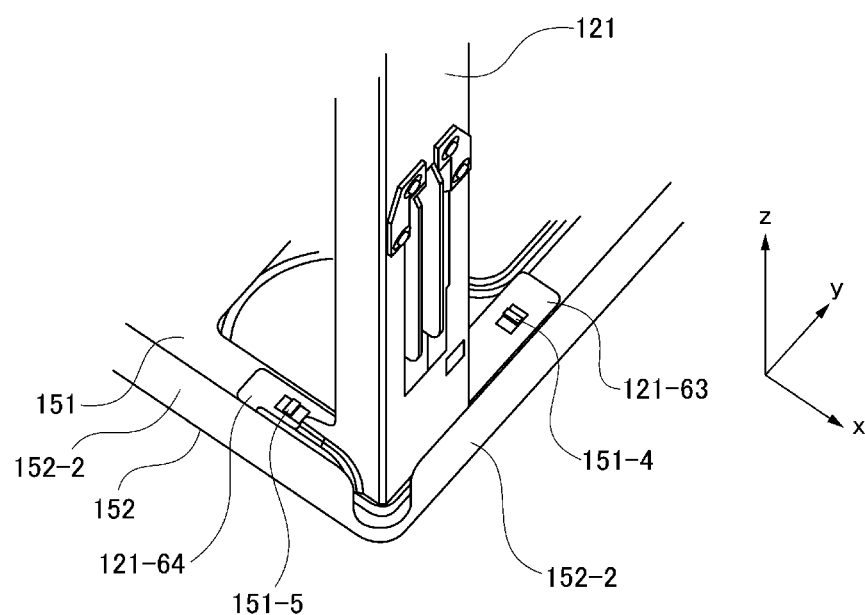
FIG. 10 is a perspective view of the joint portion of the bottom plate and the support rod of the support frame for a sheet conveying apparatus according to the embodiment of the present invention.
Figure 11:
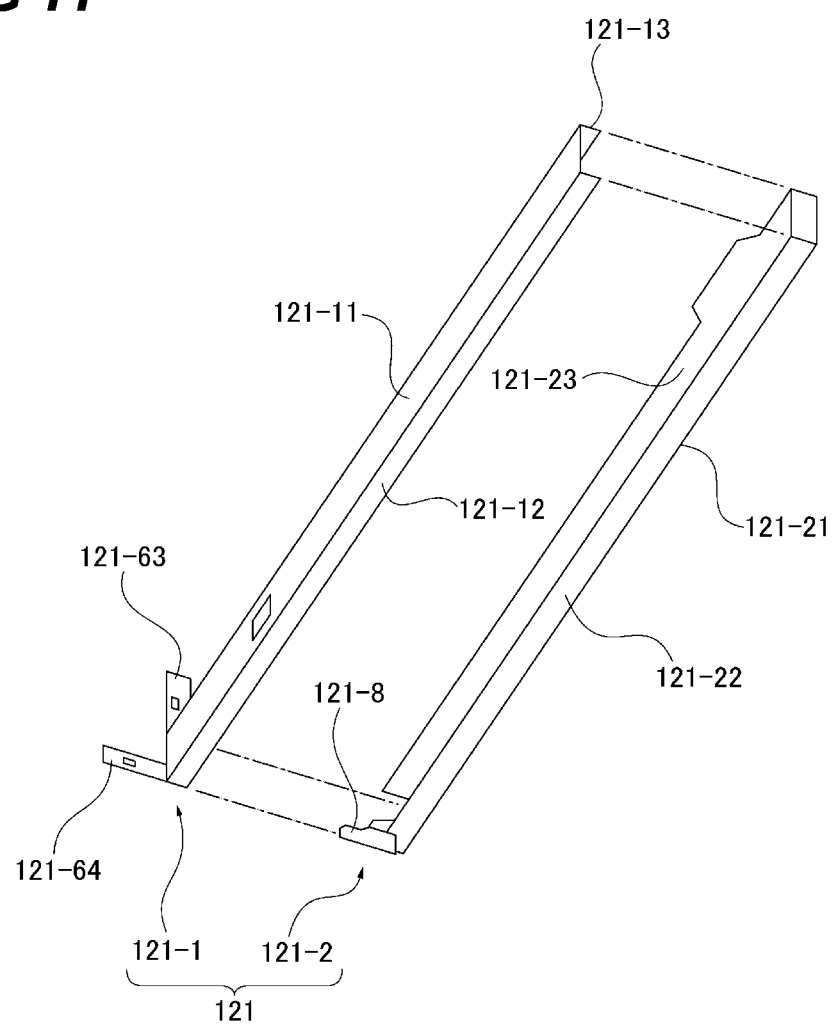
FIG. 11 is an exploded perspective view of the support rod of the support frame for a sheet conveying apparatus according to the embodiment of the present invention.
Figure 12:
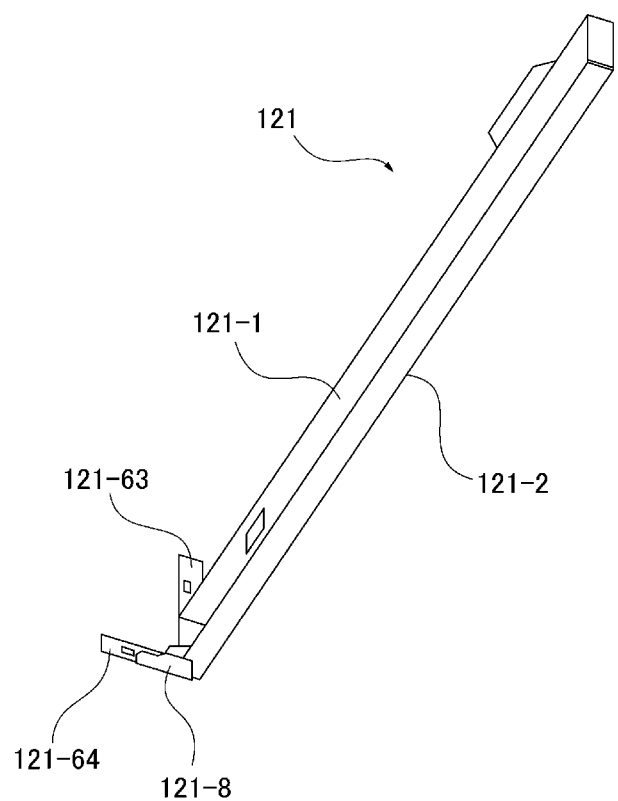
FIG. 12 is a perspective view of the support rod of the support frame for a sheet conveying apparatus according to the embodiment of the present invention.

The lance portion is provided at the four corners of the bottom plate 150, but the lance portions other than the lance portions 151-4 and 151-5 that are provided at the right front corner illustrated in FIGS. 9 and 10 are omitted in the drawings. Further, since the lance portions provided at the four corners of the bottom plate 150 have the same configuration, the configurations of the lance portion 151-4 and the lance portion 151-5 will be described, and the description of the configurations of the other lance portions will be omitted.

The edge wall portion 151-2 as a first wall portion is formed by being bent approximately 90 degrees (approximately at a right angle) downward in the vertical direction with respect to the flat surface portion 151-1 as a first surface portion by edge drawing, and is welded and joined to an edge wall portion 152-2 of the second member 152. Here, approximately 90 degrees includes a manufacturing error in the bending process of sheet metal.

The mounting shape portion 151-3 is provided on the front side and the back side of the bottom plate 150 and on the outside of the recording material conveying member 900 arranged in the support frame 1 (see FIG. 6). The mounting shape portion 151-3 includes the mounting portion 158-1 to which the caster 158 is attached (see FIG. 7).

As illustrated in FIG. 10, each of the lance portions 151-4 and 151-5 is formed in a rectangular shape when viewed from above and an upwardly projecting shape, and positions members when the support rods 121, 122, and 123, which will be described later, are attached to the first member 151.

Specifically, the lance portion 151-4 is connected to the first member 151 at both ends in a front-back direction, and restricts the movement of the support rod 121 in a left-right direction in FIG. 10 to position the support rod 121 in the left-right direction. The lance portion 151-4 includes a projecting portion 151-41 and a cut-off portion 151-42.

The projecting portion 151-41 is formed by drawing so as to project upward from the both end portions connected to the first member 151 in the front-back direction toward the central portion.

The cut-off portion 151-42 is processed so as to have a cut-off shape that is cut from the first member 151 and has a cut surface. The cut-off portion 151-42 projects upward from the first member 151 and includes a pair of end surfaces perpendicular to the upper surface of the first member 151, thus having a vertical stepped shape. The paired end surfaces of the cut-off portion 151-42 extend parallel to each other in the front-back direction.

The lance portion 151-5 is connected to the first member 151 at both ends in the left-right direction, which is an extension direction, and restricts the movement of the support rod 121 in the front-back direction to position the support rod 121 in the front-back direction. The lance portion 151-5 includes a projecting portion 151-51 and a cut-off portion 151-52.

The projecting portion 151-51 is formed by drawing so as to project upward from the both end portions connected to the first member 151 in the left-right direction toward the central portion.

The cut-off portion 151-52 is processed so as to have a cut-off shape that is cut from the first member 151 and has a cut surface. The cut-off portion 151-52 projects upward from the first member 151 and includes a pair of end surfaces perpendicular to the upper surface of the first member 151, thus having a vertical stepped shape. The paired end surfaces of the cut-off portion 151-52 extend parallel to each other in the left-right direction.

The first member 151 may include a positioning portion with an embossed shape, instead of the lance portions 151-4 and 151-5.

The caster 158 that is inserted into a hole-shaped portion 152-4 of the second member 152 to be described later is attached to the mounting portion 158-1. As illustrated in FIG. 7, the mounting portion 158-1 is provided at a position higher than the upper surface of the first member 151, which is the installation surface of the recording material conveying member 900.

The second member 152 forms the lower surface of the bottom plate 150 in the vertical direction, and has a substantially rectangular shape when viewed from above in the vertical direction. Here, the substantially rectangular shape includes not only a shape in which the four corners are right angles, but also a shape in which each of the four corners is chamfered. The second member 152 includes a flat surface portion 152-1 that is flat along the horizontal direction, the edge wall portion 152-2 that is provided on the peripheral edge of the rectangle, a cone trapezoidal portion 152-3, the hole-shaped portion 152-4, and an extending portion 152-6. The edge wall portion 152-2 and the extending portion 152-6 form a second wall portion. As illustrated in FIG. 8, the second member 152 has a surface 152-5 between the edge wall portion 152-2 and the hole-shaped portion 152-4.

Figure 5:
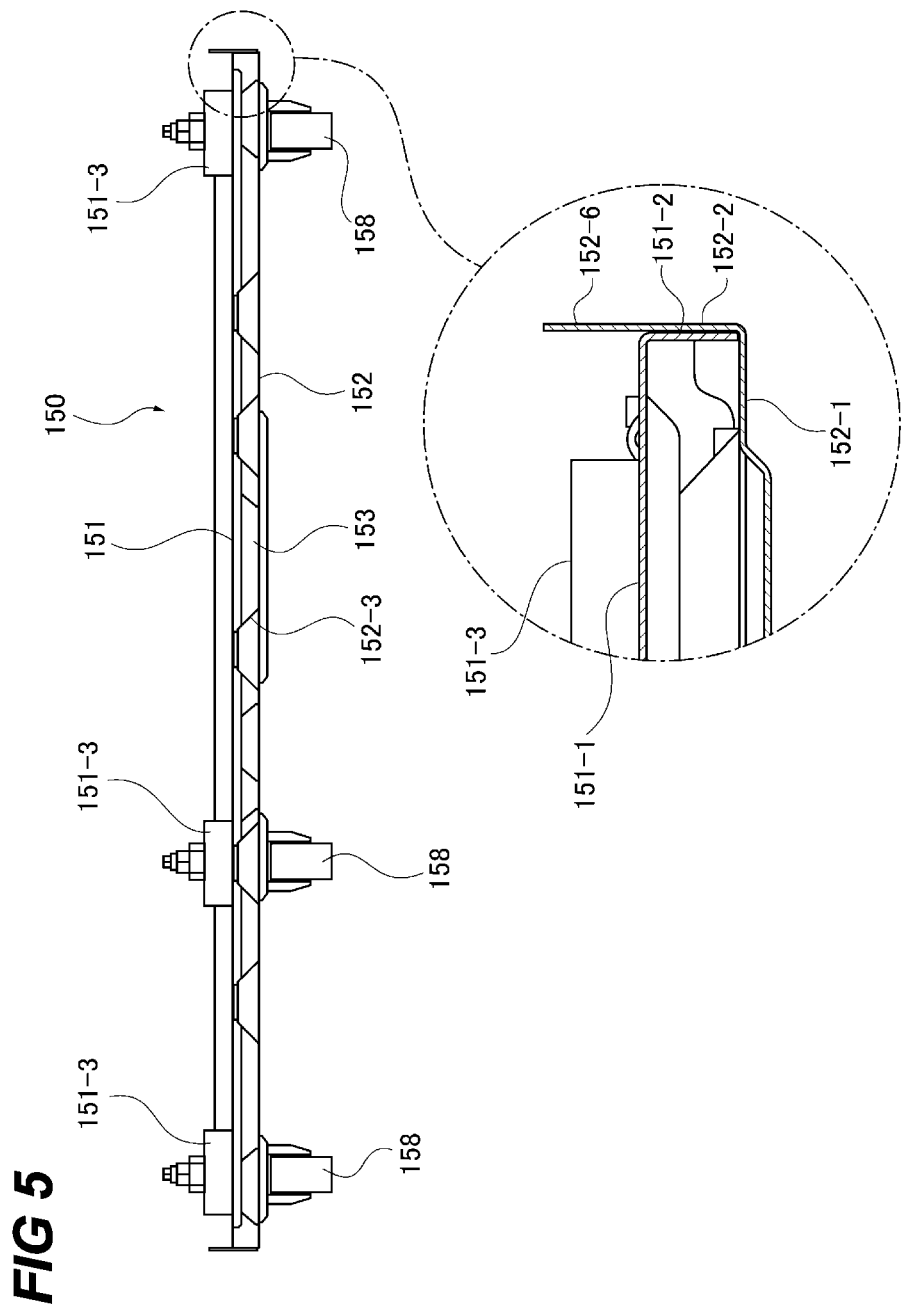
FIG. 5 is a cross-sectional view of the bottom plate of the support frame for a sheet conveying apparatus according to the embodiment of the present invention.

The edge wall portion 152-2 is formed by being bent approximately 90 degrees (approximately at a right angle) upward in the vertical direction with respect to the flat surface portion 152-1 as a second surface portion by edge drawing. As illustrated in FIG. 5, the edge wall portion 152-2 is arranged so as to be overlapped with the edge wall portion 151-2 on the outside of the edge wall portion 151-2 of the first member 151. The edge wall portion 152-2 is welded and joined to the edge wall portion 151-2.

The cone trapezoidal portion 152-3 is formed in a plurality of locations of the flat surface portion 152-1 by being deformed into a cone trapezoidal shape from the flat surface portion 152-1 toward the cavity portion 153 of the bottom plate 150 in a projecting manner, and is joined to the flat surface portion 151-1 of the first member 151 (see FIG. 5).

The hole-shaped portion 152-4 is a through-hole that penetrates the second member 152 in a plate thickness direction, and is provided at a distance from the edge wall portion 152-2 in the horizontal direction as illustrated in FIG. 8. The swivel portion that changes the direction of the wheel of the caster 158 is inserted into the hole-shaped portion 152-4. The hole-shaped portion 152-4 is formed so as to be larger than the swivel operation range of the swivel portion.

As illustrated in FIG. 5, the extending portion 152-6 extends upward from the edge wall portion 152-2, and also extends above the flat surface portion 151-1 of the first member 151. The extending portion 152-6 is integrally formed with the edge wall portion 152-2. As a result, the edge portion of the second wall portion is located vertically above the flat surface portion 151-1 of the first member 151. The extending portion 152-6 is fastened to the facing surface of the support rod 121 that is elastically deformably positioned on the first member 151.

The extending portion 152-6 also functions as a brace portion that prevents the support rod 121 fastened from falling over. For example, the extending portion 152-6 provided on the right side edge wall portion 152-2 of the second member 152 with a rectangular shape has high rigidity for the back, and thus the extending portion 152-6 functions as the brace portion that prevents the support rod 121 fastened from falling backward. It is only required that the extending portion 152-6 is provided on the edge wall portion 152-2 on at least one of the four sides, that is, the front, back, left, and right sides of the rectangular second member 152, if necessary, and the extending portion 152-6 does not necessarily have to be provided on the edge wall portion 152-2 on all the sides of the second member 152.

In the bottom plate 150 with the configuration described above, the surface 152-5 is provided for the hole-shaped portion 152-4 into which the caster 158 is inserted, and thus the strength of the second member 152 of the bottom plate 150 is achieved. Consequently, the edge wall portion 152-2 formed at a distance from the hole-shaped portion 152-4 in order to form the surface 152-5 is located at the outermost position in the horizontal direction. As a result, the difference in the projected area of the bottom plate 150 with respect to the projected area of the installation surface surrounded by a virtual line connecting the casters 158 of the support frame 1 can be made as small as possible. Therefore, the bottom plate 150 can be reduced in size as compared with the configuration in which the edge wall portion of the first member is provided outside the edge wall portion of the second member to which the casters are attached, and thus the support frame 1 can be reduced in size accordingly.

Further, since the bottom plate 150 can be reduced in size without cutting out the edge wall portion 152-2, it is possible to prevent a decrease in the strength and rigidity of the bottom plate 150.

Furthermore, as the support rod 121 is fastened to the extending portion 152-6, the bottom plate 150 and the support rod 121 can be fastened at an end position of the bottom plate 150 with a simple configuration without increasing the first member 151 in size.

The edge wall portion 151-2 of the first member 151 and the edge wall portion 152-2 of the second member 152 may be joined by not only welding but also other methods such as caulking or screwing. Moreover, the cone trapezoidal portion 152-3 does not necessarily have to be provided in the second member 152, and may be provided in the first member 151 and joined to the second member 152. Further, the first member 151 and the second member 152 may be joined by plates arranged in a honeycomb shape, square pipes for reinforcement, or plates bent and arranged in a U-shape, in an internal cavity surrounded by the first member 151 and the second member 152.

Configuration of Support Rod

The configurations of the support rods 121, 122, and 123 according to the embodiment of the present invention will be described in detail with reference to FIGS. 11 to 14. Since the support rods 121, 122, and 123 have the same configuration, the configuration of the support rod 121 will be described, and the description of the configurations of the support rods 122 and 123 will be omitted.

The support rod 121 includes an inner rod member 121-1 that is abutted against a support rod support surface 151-6 of the first member 151 to be arranged at a corner of the bottom plate 150, and forms an inner side surface and an outer rod member 121-2 that forms an outer surface.

The inner rod member 121-1 and the outer rod member 121-2 are fitted to each other in a square pipe shape so that the inside is hollow. In the inner rod member 121-1 and the outer rod member 121-2, a side surface portion 121-12 and a side surface portion 121-22, which are overlapped with each other, are joined to each other by screwing. Further, in the inner rod member 121-1 and the outer rod member 121-2, a side surface portion 121-13 and a side surface portion 121-23, which are overlapped with each other, are joined to each other by screwing.

The inner rod member 121-1 is erected on the bottom plate 150, and is bent so as to have a U-shape in a cross-section cut by a plane parallel to the bottom plate 150.

Specifically, the inner rod member 121-1 includes an inner surface portion 121-11, the side surface portions 121-12 and 121-13, abutting portions 121-61 and 121-62, and flange portions 121-63 and 121-64. The abutting portions 121-61 and 121-62, and the flange portions 121-63 and 121-64 form an erection connection portion.

The inner surface portion 121-11 connects the side surface portion 121-12 and the side surface portion 121-13.

The inner rod member 121-1 is formed by being bent in a U shape, so that the side surface portions 121-12 and 121-13 face each other.

Figure 13:
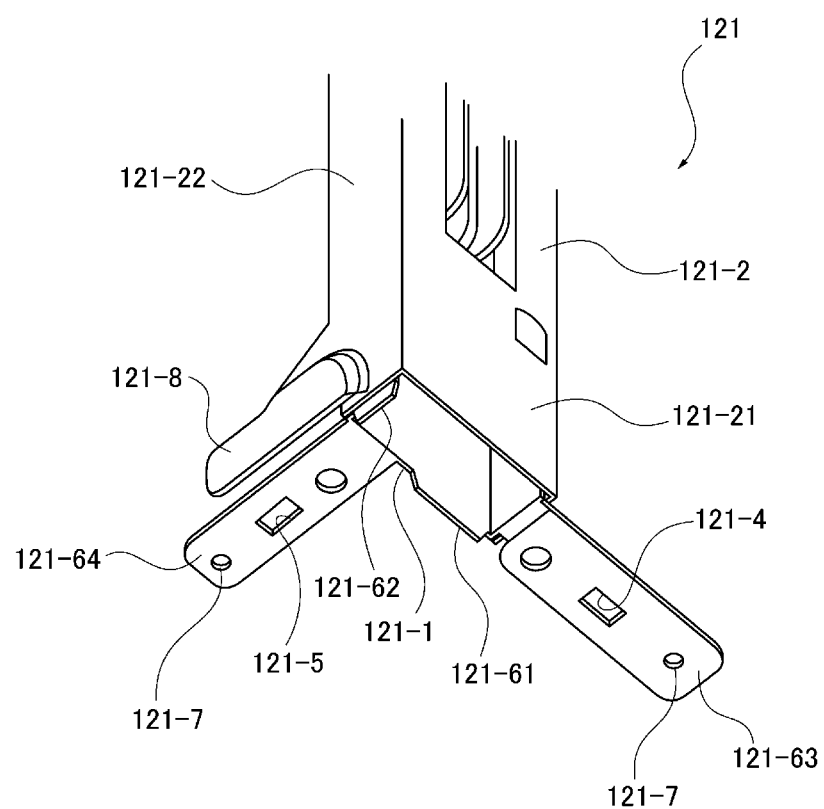
FIG. 13 is a perspective view of a part of the support rod of the support frame for a sheet conveying apparatus according to the embodiment of the present invention.

As illustrated in FIG. 13, the abutting portion 121-61 is provided on one of three sides of the U-shaped lower end portion of the inner rod member 121-1 with a U-shape. The abutting portion 121-61 abuts against the support rod support surface 151-6 on the upper surface of the first member 151.

As illustrated in FIG. 13, the abutting portion 121-62 is provided on a side connected to the side on which the abutting portion 121-61 is provided, among the three sides of the U-shaped lower end portion of the inner rod member 121-1. The abutting portion 121-62 abuts against the support rod support surface 151-6 on the upper surface of the first member 151.

The flange portion 121-63 extends backward from one of the three sides of the U-shaped lower end portion of the inner rod member 121-1 with a U-shape. The flange portion 121-63 extends parallel to the upper surface of the first member 151, and abuts against the support rod support surface 151-6 on the upper surface of the first member 151. The flange portion 121-63 includes an engagement hole 121-4 that engages with the lance portion 151-4 provided on the upper surface of the first member 151 to position the support rod 121 with respect to the bottom plate 150. The flange portion 121-63 also includes a fastening portion 121-7 that is fastened to a fastening portion 151-7 provided on the upper surface of the first member 151.

The flange portion 121-64 extends leftward from one side connected to the side along which the flange portion 121-63 at the lower end portion of the inner rod member 121-1 extends, and on which the abutting portion 121-61 is provided. The flange portion 121-64 extends parallel to the upper surface of the first member 151, and abuts against the support rod support surface 151-6 on the upper surface of the first member 151. The flange portion 121-64 includes an engagement hole 121-5 that engages with the lance portion 151-5 provided on the upper surface of the first member 151 to position the support rod 121 with respect to the bottom plate 150. The flange portion 121-64 also includes the fastening portion 121-7 that is fastened to the fastening portion 151-7 provided on the upper surface of the first member 151.

The outer rod member 121-2 is erected on the bottom plate 150, and is bent so as to have a U-shape in a cross-section cut by a plane parallel to the bottom plate 150. Specifically, the outer rod member 121-2 includes an outer surface portion 121-21, the side surface portions 121-22 and 121-23, and a projecting portion 121-8.

The outer surface portion 121-21 connects the side surface portion 121-22 and the side surface portion 121-23.

The outer rod member 121-2 is formed by being bent in a U shape, so that the side surface portions 121-22 and 121-23 face each other.

The projecting portion 121-8 is formed by being deformed so as to project forward from the side surface portion 121-22 when the outer rod member 121-2 is erected on the first member 151. The projecting portion 121-8 includes an inclined surface portion that is inclined toward the extending portion 152-6 and a flat surface portion that is substantially parallel to the extending portion 152-6. The flat surface portion of the projecting portion 121-8 is provided in a gap (for example, 0.2 mm) between the extending portion 152-6 and the side surface portion 121-22, and is fastened to the extending portion 152-6.

Here, the gap between the extending portion 152-6 and the side surface portion 121-22 is caused by the following factors.

That is, in the support rod 121, when the abutting portions 121-61 and 121-62 are provided on the two sides of the U-shape, one of the two sides is short, and thus only the flange portion 121-63 is provided on the shorter side. Consequently, the abutting portions 121-61 and 121-62 are respectively provided on the longer left side and the shorter front side of the support rod 121. In this case, the abutting portion 121-62 provided on the front shorter side abuts against the support rod support surface 151-6 inside of a connecting portion 151-9 with an R-shape between the flat surface portion 151-1 and the edge wall portion 151-2. Consequently, there is a gap between the side surface portion 121-22 of the outer rod member 121-2 and the extending portion 152-6, and the gap cannot be filled with the extending portion 152-6 even if the extending portion 152-6 is elastically deformed.

More specifically, in the support rod 121 provided at the front right corner illustrated in FIG. 9, the flange portions 121-63 and 121-64 are respectively provided on the back short side and the left long side of the inner rod member 121-1. Consequently, the flange portion 121-64 and the abutting portion 121-61 can be provided on the left long side of the support rod 121. On the other hand, since the flange portion 121-63 is formed on the back short side of the support rod 121, the abutting portion cannot be provided. As a result, the support rod 121 includes the abutting portion 121-62 on the front short side.

In this case, the abutting portion 121-62 of the inner rod member 121-1 abuts against the support rod support surface 151-6 inside of the R-shaped connecting portion 151-9 of the bottom plate 150. As a result, a gap (for example, 3 mm) is formed between the side surface portion 121-22 and the extending portion 152-6.

It is only required that the abutting portions 121-61 and 121-62 are provided on at least two of the three sides of the U-shaped inner rod member 121-1, and the abutting portions 121-61 and 121-62 may be provided on all three sides of the inner rod member 121-1. Further, the abutting portions 121-61 and 121-62 are not necessarily have to be provided on two adjacent sides of the three sides of the U-shaped inner rod member 121-1, and may be provided on two opposite sides of the three sides of the inner rod member 121-1. As a result, it is possible to prevent the support rod 121 in a vertical state with respect to the bottom plate 150 from falling over when the support rod 121 is assembled to the bottom plate 150 or when a load is applied due to vibration during transportation of the apparatus.

Arrangement of Support Rods on Bottom Plate

The arrangement of the support rods 121, 122, and 123 on the bottom plate 150 according to the embodiment of the present invention will be described in detail with reference to FIG. 14.

The support rods 121, 122 and 123 are arranged on the bottom plate 150 as described in (1) to (5) below. Since the arrangements of the support rods 121, 122, and 123 on the bottom plate 150 are the same, the arrangement of the support rod 121 will be described, and the description of the arrangements of the support rods 122 and 123 will be omitted.

Figure 14:
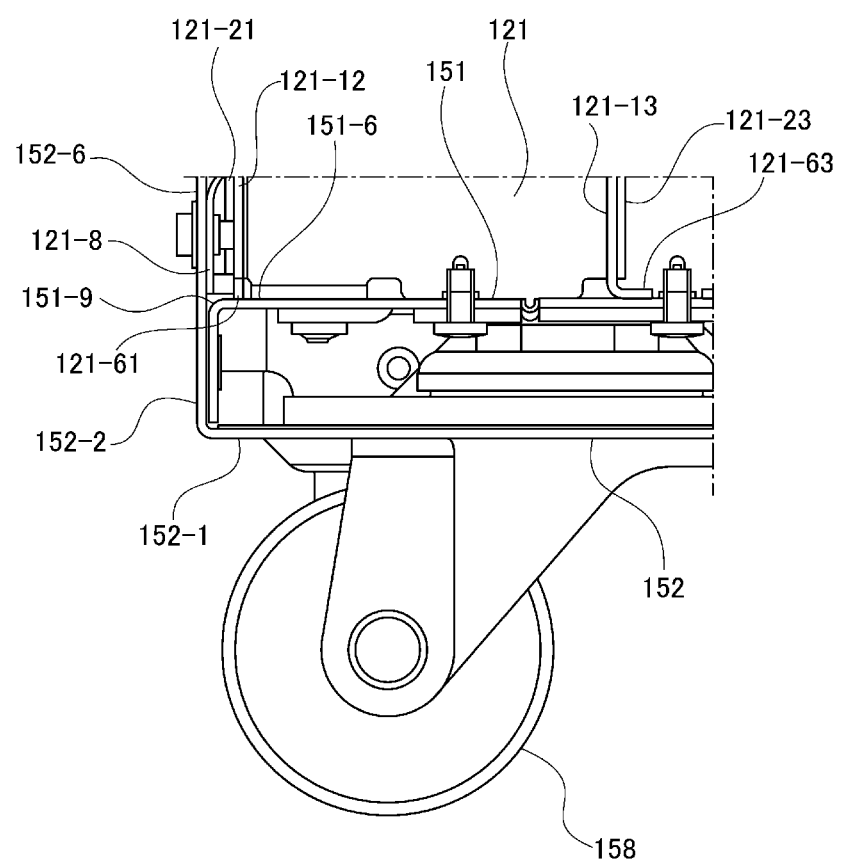
FIG. 14 is a cross-sectional view of the joint portion of the bottom plate and the support rod of the support frame for a sheet conveying apparatus according to the embodiment of the present invention.

(1) The connecting portion 151-9 of the flat surface portion 151-1 and the edge wall portion 151-2 in the first member 151 of the bottom plate 150 has an R shape as illustrated in FIG. 14. Consequently, the fastening portion 151-7 of the first member 151 is provided inside of the connecting portion 151-9 with an R-shape.

(2) The lance portions 151-4 and 151-5 that position the support rod 121 in the x direction or the y direction with respect to the bottom plate 150 are provided at a position away from a corner of the bottom plate 150 along the edge wall portion 152-2 by a predetermined distance. Further, the flange portions 121-63 and 121-64 of the support rod 121 that is erected at a corner of the bottom plate 150 extend in a direction away from the corner of the support rod 121. Specifically, the support rod 121 that is erected at the right front corner of the bottom plate 150 includes the flange portion 121-63 extending backward from the side surface portion 121-13 of the support rod 121, and the flange portion 121-64 extending leftward from the inner surface portion 121-11 of the support rod 121.

(3) As the abutting portions 121-61 and 121-62 of the support rod 121 abut against the upper surface of the first member 151, the lower portion of the support rod 121 is positioned with respect to the bottom plate 150. Further, as the fastening portion 121-7 of the support rod 121 is fastened to the fastening portion 151-7 of the first member 151, the upward movement of the support rod 121 is restricted to prevent the support rod 121 from being separated from the first member 151, so that the support rod 121 keeps abutting against the first member 151.

(4) Positioning portions of the support rod 121 including the inner rod member 121-1 and the outer rod member 121-2 in the x, y and z directions with respect to the bottom plate 150 are provided only on the inner rod member 121-1. The positioning portion does not necessarily have to be provided only on the inner rod member 121-1, and may be provided only on the outer rod member 121-2. As a result, it is possible to prevent a dimensional tolerance and a joining misalignment between one of the inner rod member 121-1 and the outer rod member 121-2 and the other thereof, and the support rod 121 can be accurately positioned with respect to the bottom plate 150.

(5) The support rod 121 includes the abutting portions 121-61 and 121-62 on two sides of the U-shaped lower end portion of the inner rod member 121-1 of the support rod 121, the two sides being connected to each other. This prevents the support rod 121 erected on the bottom plate 150 from falling over when the support rod 121 is assembled to the bottom plate 150 or when a load is applied due to vibration during transportation of the apparatus.

Here, arrangement (5) described above can adopt the following arrangement. When the abutting portions 121-61 and 121-62 are provided on two connected sides of a U-shape, the fastening portions of the support rod 121 to the bottom plate 150 can be provided on two sides of the U-shaped lower end portion, the two sides respectively facing the two sides on which the abutting portions 121-61 and 121-62 are provided. That is, the abutting portion or the fastening portion can be provided on four sides of a square-shaped lower end portion of the support rod 121 with a square shape, the square shape being formed by combining the inner rod member 121-1 with a U-shape and the outer rod member 121-2 with a U-shape.

The abutting portion of the support rod 121 does not necessarily have to be provided on two connected sides of the U-shape, and may be provided on two opposite sides of the U-shape. Further, when the abutting portions 121-61 and 121-62 are provided on two opposite sides of the U-shape, the fastening portions of the support rod 121 to the bottom plate 150 can be provided on two opposite sides that sandwich the abutting portions 121-61 and 121-62.

Configuration of Providing Support Rods at Corners of Bottom Plate

The configuration of providing support rods at the corners of a bottom plate according to the embodiment of the present invention will be described in detail. In the configuration of providing support rods at the corners of a bottom plate, a description will be given by using the support rod 121 for convenience of description, although a part of the configuration of the support rod 121 is different.

In the case where the abutting portion and the flange portion are provided at the lower end portion of the inner rod member 121-1 of the support rod 121, the best configuration of bringing the support rod 121 closest to the corner of the bottom plate 150 is as follows. That is, the abutting portion is provided on two connected sides of the lower end portion of the inner surface portion 121-11 of the support rod 121 and the lower end portion of the side surface portion 121-13 of the support rod 121. Further, the flange portion is provided on two connected sides of the lower end portion of the inner surface portion 121-11 and the lower end portion of the side surface portion 121-13 in the support rod 121. Furthermore, the fastening portion to the bottom plate 150 is provided on the outer surface portion 121-21 and the side surface portion 121-22 of the outer rod member 121-2 of the support rod 121.

Moreover, in the case where the abutting portion and the flange portion are provided at the lower end portion of the inner rod member 121-1 of the support rod 121, the second best configuration of bringing the support rod 121 closest to the corner of the bottom plate 150 next to the best configuration described above is as follows. That is, one of the abutting portions provided on the inner surface portion 121-11 and the side surface portion 121-13 of the support rod 121 is provided at the lower end portion of the side surface portion 121-12, and other configurations are the same as in the best configuration described above. In this case, the abutting portion provided at the lower end portion of the side surface portion 121-12 abuts against the support rod support surface 151-6 so as to be located inside of the connecting portion 151-9 with an R-shape. As a result, the support rod 121 is erected on the first member 151 to be away at least backward or leftward from the right front corner of the bottom plate 150 by a distance corresponding to the R-shape.

The best configuration and the second best configuration of the support rods 122 and 123 are similar to those of the support rod 121, although the directions are different.

In the present embodiment, the bottom plate 150 including the first member 151 having the edge wall portion 151-2 and the second member 152 having the edge wall portion 152-2, and a plurality of the casters 158 that is fixed to the bottom plate 150 and installs a sheet conveying apparatus on an installation surface are provided. Further, the second member 152 is fixed to the first member 151 by the edge wall portion 152-2 overlapping and being joined to the edge wall portion 151-2 on the outer side of the edge wall portion 151-2. Consequently, it is possible to reduce the difference in the projected area of the bottom plate 150 with respect to the projected area of the installation surface of the apparatus as compared with a conventional case, while achieving strength and rigidity in a case where the bottom plate 150 includes the casters 158 or the adjusters 159. That is, the projected area of the bottom plate 150 can be reduced by the plate thickness of the edge wall portion 151-2 of the first member 151 as compared with the case where the first member 151 overlaps the second member 152. As a result, the area of the flat surface portion 152-1 of the second member 152 defined to provide a plurality of the casters 158 is equal to the projected area of the bottom plate 150, and thus the difference in the projected area of the bottom plate with respect to the projected area of the installation surface of the apparatus can be reduced as compared with the conventional case.

Further, in the present embodiment, the edge wall portion 152-2 includes the extending portion 152-6 extending vertically above the flat surface portion 151-1, and the edge wall portion 152-2 is fixed to the first member 151 so that the edge portion of the edge wall portion 152-2 is located vertically above the flat surface portion 151-1. As a result, it is possible to prevent the support rods 121, 122, and 123 from falling over and to reinforce the bottom plate 150 without providing an additional member.

Moreover, in the present embodiment, as the support rods 121, 122, and 123 are fixed to the extending portion 152-6, the support rods 121, 122, and 123 can be provided at the corners of the bottom plate 150, resulting in downsizing.

Furthermore, in the present embodiment, the flat surface portion 152-1 includes the hole-shaped portion 152-4 that has a distance from the edge wall portion 152-2 in the horizontal direction and penetrates the flat surface portion 152-1 in the plate thickness direction. Further, a plurality of the casters 158 is inserted into the hole-shaped portions 152-4 and fixed to the first member 151. As a result, the strength and rigidity can be achieved in the case where the casters 158 are provided on the bottom plate 150.

Further, in the present embodiment, the rotatable casters 158 that cause the sheet conveying apparatus to be movable are provided at the corners of the bottom plate 150. Consequently, it is possible to reduce the difference in the projected area of the bottom plate 150 with respect to the projected area of the installation surface of the apparatus as compared with the conventional case, while achieving strength and rigidity in the case where the bottom plate 150 includes the casters 158.

Furthermore, in the present embodiment, since the support rods 121, 122, and 123 can be positioned on the upper surface of the first member 151 in the x direction and the y direction, the pitch accuracy of the support rods 121, 122, and 123 can be improved.

It goes without saying that the present invention is not limited to the embodiment described above, and can be variously modified without departing from the gist thereof.

Specifically, in the embodiment described above, the support rods 121, 122, and 123 are fastened to the upper surface of the first member 151 with screws, but the present invention is not limited to this, and the support rods 121, 122, and 123 may be attached to the first member 151 by caulking or welding.

Further, in the embodiment described above, the extending portion 152-6 includes a fastening portion, but the present invention is not limited to this, and for example, when the extending portion 152-6 does not require the fastening portion, the fastening portion does not need to be provided.

Even in this case, the extending portion 152-6 can improve the strength or rigidity of the bottom plate 150 against the force to bend the bottom plate 150 in a height direction without interfering with the recording material conveying member 900 arranged on the bottom plate 150. In particular, it is effective when the thickness of the entire bottom plate 150 cannot be increased. For example, the following case can be assumed as the case where the thickness of the entire bottom plate 150 cannot be increased. It is conceivable that a height from the floor is required to insert a lifting claw of a heavy machine such as a forklift for loading or unloading a truck on the lower surface side of the bottom plate 150, while the height is limited by the recording material conveying member 900 arranged on the upper surface side of the bottom plate 150.

Further, the support rods 121, 122, and 123 are connected to the extending portion 152-6 in the embodiment described above, but the present invention is not limited to this, and the side plate 131 and the extension portion 152-6 may be connected to each other.

Moreover, the abutting portions 121-61 and 121-62, and the flange portions 121-63 and 121-64 are provided on the inner rod member 121-1 in the embodiment described above, but the present invention is not limited to this, and these abutting portions and flange portions may be provided on the outer rod member.

Further, the surface 152-5 is provided between the hole-shaped portion 152-4 into which the caster 158 is inserted and the edge wall portion 152-2 in the embodiment described above, but the present invention is not limited to this, and the surface 152-5 may be provided between the mounting portion of the adjuster 159 and the edge wall portion 152-2. As a result, in a case where the adjuster 159 is provided at the end portion of the bottom plate 150, the bottom plate 150 can be reduced in size while the strength and the rigidity of the second member 152 are achieved.

Furthermore, the caster 158 and the adjuster 159 are provided at the end portion of the bottom plate 150 in the embodiment described above, but the present invention is not limited to this, and members other than the caster 158 and the adjuster 159 may be provided at the end portion of the bottom plate 150. Even in this case, effects similar to those in the case where the caster 158 and the adjuster 159 are provided at the end portion of the bottom plate 150 can be obtained.

Further, in the embodiment described above, the inner rod member 121-1 and the outer rod member 121-2 do not necessarily have to be joined by screwing, and may be joined by welding or caulking. Furthermore, the support rod does not necessarily have to be formed by joining the inner rod member 121-1 with a U-shape to the outer rod member 121-2 with a U-shape, and the support rod may be formed into a square pipe by joining two L-shaped members, may be formed by a member formed in a pipe shape, or may be formed in a pipe shape by bending a plate material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-092205, filed May 27, 2020, which is hereby incorporated by reference herein in its entirety.

What is claimed is:

1. A support frame for a sheet conveying apparatus, comprising:
    a bottom plate that includes a first member that has a first plate with a substantially rectangular shape and a second member that has a second plate with a substantially rectangular shape, the first plate and the second plate being overlapped with each other in a vertical direction so that the second plate is provided below the first plate in the vertical direction;
    a support rod that is fixed to the bottom plate; and
    a plurality of installation members that is fixed to the bottom plate and installs the sheet conveying apparatus on an installation surface, wherein
    the second plate includes a plurality of holes provided with a distance from a peripheral edge of the second plate in a horizontal direction and penetrating the second plate in the vertical direction, and
    the plurality of installation members are respectively inserted into the plurality of holes, and fixed to the first plate.

2. The support frame for a sheet conveying apparatus according to claim 1, wherein
    the first member has a first wall portion that is bent at a substantially right angle to the first plate and extends vertically downward from a peripheral edge of the first plate, and
    the second member has a second wall portion that is bent at a substantially right angle to the second plate and extends vertically upward from the peripheral edge of the second plate.

3. The support frame for a sheet conveying apparatus according to claim 2, wherein
    the second member is fixed to the first member by the second wall portion overlapping and being joined to the first wall portion on an outer side of the first wall portion.

4. The support frame for a sheet conveying apparatus according to claim 3, wherein
    the second wall portion includes an extending portion that extends vertically above the first plate of the first member, and the second wall portion is fixed to the first member so that an edge of the extending portion of the second wall portion is located vertically above the first plate.

5. The support frame for a sheet conveying apparatus according to claim 4, wherein
    the support rod is fixed to the extending portion of the second wall portion.

6. The support frame for a sheet conveying apparatus according to claim 3, wherein
    the support rod includes a projecting portion that is erected on the first member inside of a rectangular peripheral edge of the first member, and projects toward the second wall portion to be connected to the second wall portion.

7. The support frame for a sheet conveying apparatus according to claim 1, wherein
    the installation member is a rotatable caster that causes the sheet conveying apparatus to be movable, and is provided at a corner of the bottom plate.

8. The support frame for a sheet conveying apparatus according to claim 1, wherein
    the support rod includes an inner rod member and an outer rod member joined to each other, one of the inner rod member and the outer rod member includes an erection connection portion that is connected to the first member to erect the support rod, and
another of the inner rod member and the outer rod member does not include the erection connection portion.

9. The support frame for a sheet conveying apparatus according to claim 8, wherein
the one of the inner rod member and the outer rod member has a U-shaped cross-section cut by a plane parallel to the bottom plate when the support rod is erected on the first member, and includes the erection connection portion on each of three sides of a lower end portion that abuts against the first member.

10. The support frame for a sheet conveying apparatus according to claim 1, wherein
the bottom plate includes a cavity portion that is formed in an internal space surrounded by the first member and the second member, and
at least one of the first member and the second member includes a cone trapezoidal portion that projects into the cavity portion to connect the first member and the second member.

11. A sheet conveying apparatus comprising:
a conveying unit configured to convey a sheet; and
the support frame according to claim 1, the support frame supporting the conveying unit.

\* \* \* \* \*